Patented Sept. 14, 1954

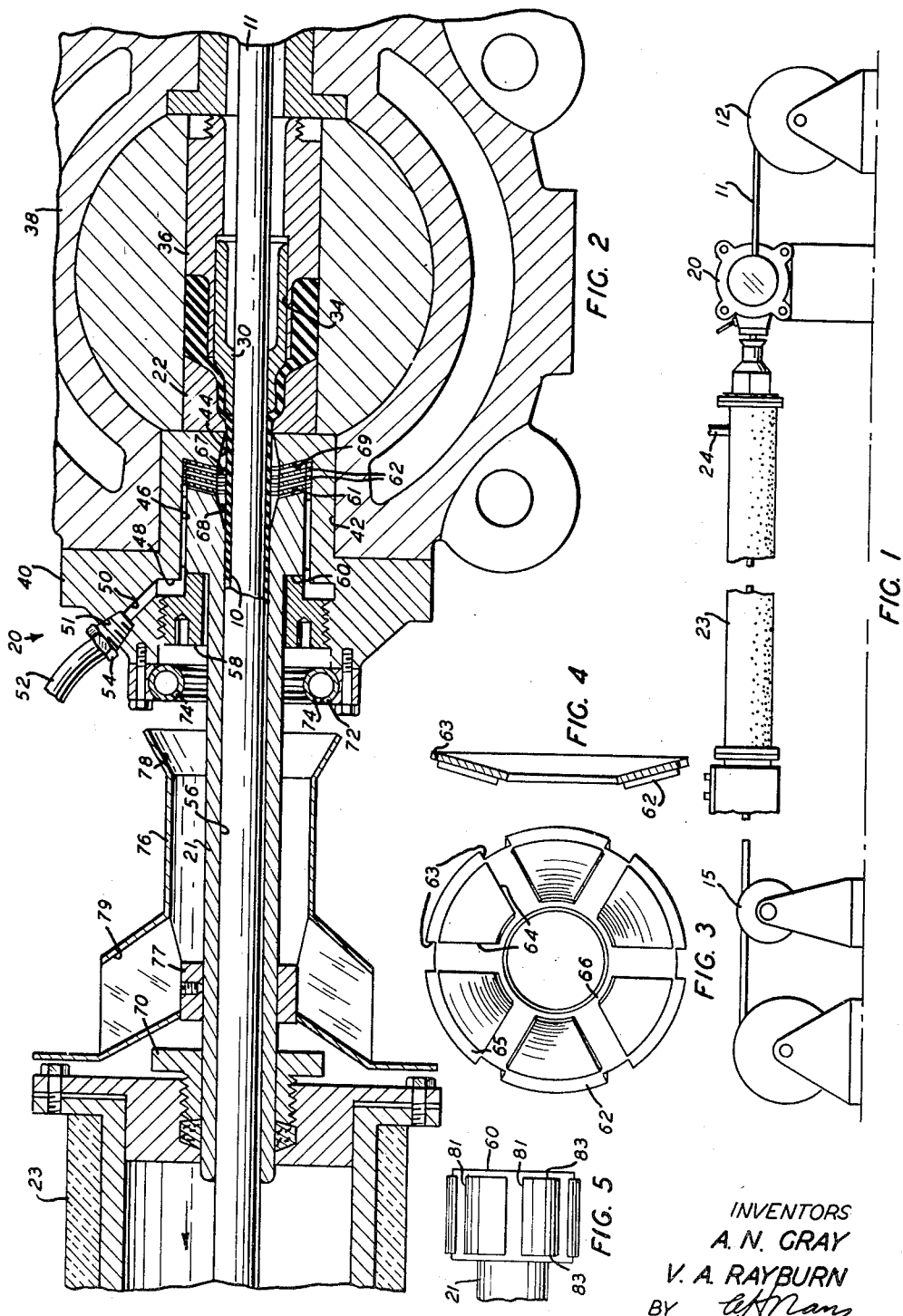

2,688,767

UNITED STATES PATENT OFFICE 2,688,767

APPARATUS FOR CONTINUOUSLY MAKING VULCANIZED ARTICLES

Alvin N. Gray, Edgewood, and Vincent A. Rayburn, Baltimore, Md., assignors to Western Electric Company, Incorporated, New York, N. Y., a corporation of New York Application December 6, 1950, Serial No. 199,466

2 Claims. (Cl. 18—6)

This invention relates to apparatus for continuously making vulcanized articles, and particularly to apparatus for making jacketed cables.

In some processes used in the past, elongated filamentary articles have been continuously covered by extruded layers of vulcanizable compounds which are then vulcanized continuously by drawing the covered articles through long vulcanizing tubes filled with steam. In order to increase the output of such apparatus, the vulcanizing tube employed sometimes is made as long as several hundred feet to permit the covering to be extruded and the covered article to be advanced at very rapid rates and still remain in the vulcanizing tube a sufficient period of time for complete vulcanization of the covering.

The freshly extruded covering is soft and plastic in about the first half of the tube, but is comparatively tough at the exit end of the vulcanizing tube. Heretofore it has been difficult to extrude and continuously vulcanize a covering on a relatively heavy article at a high rate of speed without damaging the article because the article sags due to its weight and slides along the bottom of the vulcanizing tube for the greater part of the length of the vulcanizing tube. As a result, the soft covering sometimes is scuffed as it is dragged along the bottom of the vulcanizing tube, and the finished product may be unacceptacle.

An object of the invention is to provide new and improved apparatus for continuously making vulcanized articles.

A further object of the invention is to provide new and improved apparatus for making jacketed cables without scuffing the jackets thereof.

An apparatus illustrating certain features of the invention may include an extruder for forming at least a vulcanizable covering of a filament, means for advancing the filament continuously from the extruder and a heated tube fitting closely around the filament for curing the outer portion of the covering.

A complete understanding of the invention may be obtained from the following detailed description of a method and an apparatus forming specific embodiments thereof, when read in conjunction with the appended drawings, in which:

Fig. 1 is a fragmentary, side elevation of an apparatus forming one embodiment of the invention;

Fig. 2 is an enlarged, fragmentary vertical section of the apparatus;

Fig. 3 is an enlarged, perspective view of a laminate forming a portion of the apparatus shown in Fig. 1;

Fig. 4 is a vertical section of the laminate, and

Fig. 5 is a fragmentary elevation of a skin-curing tube employed in the apparatus.

Referring now in detail to the drawings, there is shown therein a continuous extruding and vulcanizing machine for forming and vulcanizing a protective jacket 10 (Fig. 2) around a heavy cable core 11 (Fig. 1) of substantial length to form a covered cable. In forming the jacket on the cable core 11, the core is advanced continuously from a supply reel 12 by a capstan 15, through an extruder 20, which extrudes thereon the jacket of a vulcanizable compound, such as a rubber compound, a polymerized chloroprene compound or a compound including a copolymer of butadiene and styrene.

The jacketed cable is advanced from the extruder through a close-fitting, skin-curing tube 21, which is spaced closely to a die 22, and then into an elongated, steam-jacketed vulcanizing tube 23. The tube 21 preferably is of copper and is sufficiently massive to conduct heat along its entire length. The tube 23 has an inlet pipe 24 through which steam under a high pressure, such as, for example, a pressure of around 100 pounds per square inch, is supplied to the tube 23. The steam supplied to the vulcanizing tube 23 by the inlet pipe 24 is sufficiently hot and is under a pressure sufficiently high to vulcanize the extruded jacket 10. The extruder 20 includes a core centering tube 30 (Fig. 2), and the jacket-forming die 22, which forms the compound into the jacket 10, positioned in a passage 34 formed through a tool-holder 36 mounted in an extruding head 38.

An adapter 40, fitting in a bore 42 formed in the extruding head and bolted to the extruding head, has a tapered bore 44 therein. The adapter also has a counterbore 46, an annular groove 48, and a passage 50 and a threaded socket 51 communicating with the groove 48. A pipe 52 leading from a supply of a lubricant is connected by a fitting 54 to the passage 50. A suitable lubricant is a molten metallic soap, such as zinc stearate. The skin-curing tube 21 has a bore 56 therein of slightly larger diameter than that of the die 22 so that it barely contacts the jacket 10, which swells somewhat after leaving the die.

The tube 21 is locked to the adapter 40 by a threaded bushing 58 engaging a head 60 formed on the tube 21. The head 60 fits in the counterbore 46, and is provided with a frusto-conical end 61, which holds a pile of thin metal laminates 62—62, of generally frusto-conical shape, in snug engagement between the tube 21 and a frusto-conical end 69 of the counterbore 46. The laminates 62—62 have notches 63—63 in their outer edges to permit a flow of lubricant therepast, and also have shallow radial grooves 64—64 in the front faces thereof and annular recessed portions 65 and 66 at the outer and inner ends, respectively, of the grooves 64—64. The grooves 64—64 and the recessed portions 65 and 66 should be sufficiently shallow to prevent the covering compound from entering them, but are large enough to permit the flow of the lubricant therethrough. The depth of the grooves 64—64 preferably should be about 0.004 inch. The head 60 is provided with longitudinal grooves 81—81 (Fig. 5) and annular recesses 83—83 at the opposite ends of the grooves 81—81 to permit the flow of lubricant to the laminates 62—62. The lubricant flows through the recesses, and the grooves to an enlarged portion 67 of the passage formed by the tapered bore 44, the laminates 62—62 and a tapered portion 68 of the bore 56.

The left hand end of the skin-curing tube 21, as viewed in Fig. 2, fits slidably in a stuffing box 70 mounted on the entrance end of the vulcanizing tube 23. A gas burner ring 72 having apertures 74—74 directed angularly toward the skin-curing tube 21 is supplied with a combustible gas, and directs flames on the skin-curing tube. A tubular shield 76, which is secured to the tube 21 by a ring 77, has a tapered entrance portion 78 for guiding the flames onto the skin-curing tube. The shield 76 is provided with a flared outlet 79 for the hot products of combustion from the gas flames.

Operation

The cable core 11 is advanced continuously through the extruder 20, the enlarged portion 67 of the passage, the skin-curing tube 21 and the vulcanizing tube 23. The extruder continuously forms the covering 10 of unvulcanized, vulcanizable compound around the core, and the lubricant in the enlarged portion 67 covers the outer surface of the covering to lubricate it in its passage through the skin-curing tube. The flame from the gas burner ring 72 is directed onto the tube 21 by the shield 76, and heats the tube 21 to a temperature sufficiently high to vulcanize the outer portion of the covering 10 but not so high as to char the covering 10. The skin-curing tube vulcanizes the outer portion of the covering 10 to form a tough, abrasion resistant skin thereon, which prevents damage to the covering as the covering is forced by sag of the core 10 in the elongated vulcanizing tube against the bottom of the tube. The high pressure steam supplied to the vulcanizing tube vulcanizes the unvulcanized inner portions of the covering as it is advanced through the vulcanizing tube.

The laminates 62—62 are mounted in the apparatus in positions pointing in the same direction as that in which the cable is advanced through the apparatus. Consequently, the cable tends to draw away the compound and lubricant from the grooves and recesses rather than to force these materials back into them. Consequently, these passages are kept clear, and the lubricant flows freely therethrough.

The above-described method and apparatus initially vulcanize only the outer portion of the covering 10 to form the tough skin thereon. This tough skin is not damaged by contact with the bottom of the vulcanizing tube and does not slow the vulcanization process, inasmuch as the major portion of the covering is vulcanized by the action of the steam in the vulcanizing tube.

Certain features of the above-described apparatus are disclosed and claimed in copending application Serial No. 199,467, filed December 6, 1950, by V. A. Rayburn for "Apparatus for Continuously Making Plastic-Containing Articles."

What is claimed is:

1. An apparatus for making vulcanized articles, which comprises an extruder for forming at least a vulcanizable covering of a filament, a tube fitting closely around the covering on the filament for curing the outer portion of the covering, means for applying a flame to the exterior of the tube, means for injecting a lubricant into the heated tube, a vulcanizing tube extending from the heated tube and having an internal diameter materially larger than the outer diameter of the covered filament, and means for advancing the filament continuously through the extruder, the heated tube and the vulcanizing tube.

2. An apparatus for making vulcanized articles, which comprises an extruder for covering a core, an elongated vulcanizing tube in communication with the extruder, a skin curing tube positioned at the entrance end of the vulcanizing tube for contacting a covering applied to a core by the extruder before it enters the vulcanizing tube, means for heating the skin curing tube to a temperature such that a tough skin is formed on the cover, means for injecting a lubricant into the latter tube, and means for advancing the core continuously through the extruder, the skin curing tube and the vulcanizing tube.

References Cited in the file of this patent

UNITED STATES PATENTS

| Number | Name | Date |
|---|---|---|
| 385,317 | Niedergesaess | June 26, 1888 |
| 445,711 | Chase | Feb. 3, 1891 |
| 1,370,800 | Egerton | Mar. 8, 1921 |
| 1,885,080 | Cherry et al. | Oct. 25, 1932 |
| 2,069,087 | Forstrom et al. | Jan. 26, 1937 |
| 2,291,344 | Powell | July 28, 1942 |

FOREIGN PATENTS

| Number | Country | Date |
|---|---|---|
| 3,917 | Great Britain | Feb. 23, 1895 |